United States Patent [19]

Kochert et al.

[11] Patent Number: 4,845,768

[45] Date of Patent: Jul. 4, 1989

[54] METHOD AND CIRCUIT ARRANGEMENT FOR EDITING SLANTING CHARACTERS, PARTICULARLY HANDWRITTEN CHARACTERS

[75] Inventors: Wilfried Kochert; Folkhart Langfeldt, both of Constance, Fed. Rep. of Germany

[73] Assignee: Computergesellschaft Konstanz, Fed. Rep. of Germany

[21] Appl. No.: 224,766

[22] Filed: Jul. 27, 1988

[30] Foreign Application Priority Data

Jul. 30, 1987 [DE] Fed. Rep. of Germany ....... 3725354

[51] Int. Cl.⁴ ............................................... G06K 9/32
[52] U.S. Cl. ......................................... 382/46; 382/48
[58] Field of Search ............................. 382/46, 48, 9

[56] References Cited

U.S. PATENT DOCUMENTS

| | | | |
|---|---|---|---|
| 4,533,959 | 8/1985 | Sakurai | 382/46 |
| 4,558,461 | 12/1985 | Schlang | 382/48 |
| 4,562,594 | 12/1985 | Bednar et al. | 382/48 |
| 4,611,232 | 9/1986 | Searby | 382/46 |
| 4,633,502 | 12/1986 | Namba | 382/48 |

*Primary Examiner*—Leo H. Boudreau
*Assistant Examiner*—Yonnie Jung

[57] ABSTRACT

An editing arrangement for character recognition has a binary coded character stored in a X/Y-addressable image signal memory from which signals are first read out column-by-column, whereby a first character shadow is formed from the result by projection of successive columns respectively comprising black points onto the character base line. The stored character pattern is then repeatedly read out in accord with a scanning at positive and/or negative oblique angles relative to the Y-axis until as minimum character shadow is produced. The scanned pattern yielding this minimum character shadow is then selected for further evaluation of the character.

2 Claims, 2 Drawing Sheets

METHOD AND CIRCUIT ARRANGEMENT FOR EDITING SLANTING CHARACTERS, PARTICULARLY HANDWRITTEN CHARACTERS

BACKGROUND OF THE INVENTION

The invention is directed to a method and to a circuit arrangement for editing slanting characters, particularly handwritten characters.

The classifiers utilized in machine character recognition generally only supply satisfactory results when th characters to be recognized meet certain minimum demands in terms of shape and size. The characters must not be excessively broad and excessively high because they otherwise do not fit into the prescribed scanning window. Moreover, the characters must not have an excessive slant because the classifier may be distributed by character parts from adjoining, neighboring characters. Meeting these demands presents considerable problems, particularly given handwritten characters, because character slanting both toward the left as well as toward the right, with a degree of slant that is greatly different in part due to the different writing posture, must be accommodated.

It is therefore the object of the present invention to provide a method and a circuit arrangement for automatic character recognition such that a high reading reliability is guaranteed even for slanting characters, for example italic script or block printing with different degrees of character slant.

SUMMARY OF THE INVENTION

The above object is achieved by the arrangement of the present invention.

In one embodiment of the invention there is provided an apparatus and method for storing signals produced by scanning characters with an opto-electric photo diode matrix, successively reading out the stored signals according to various degrees of slant, observing the length of shadow on the base line during the readouts, and selecting ther readout with minimum shadow length for further processing and recognition.

BRIEF DESCRIPTION OF THE INVENTION

An exemplary embodiment of the invention shall be set forth in greater detail below with reference to the drawings in which.

DESCRIPTION OF THE PREFERRED EMBODIMENT

Figure 1:
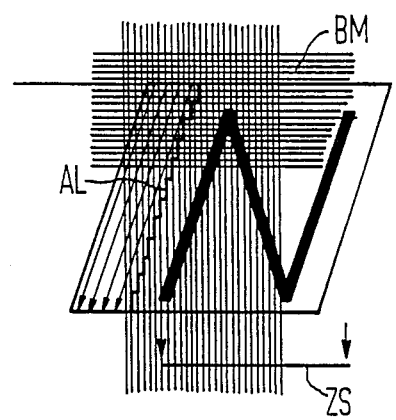
FIG. 1 illustrates a slanting character within an image pattern matrix subdivided into rows and columns and with appertaining character shadow.

FIG. 1 shows the binary bit pattern stored for the letters in an image pattern matrix BM subdivided into rows and columns and shows the character shadow ZS projected onto the base line when the bit pattern is read out of the image signal memory in vertical column-by-column order. Since as experience has shown, a slanting character is more difficult to recognize with a classifier, and may even not be recognized under certain conditions, a correction of oblique attitude is carried out in that the character is read out from different angles. When the character shadow becomes smaller after scanning from a first shear angle, this leads to a corresponding erecting of the character. In the inverse case, i.e. when the character shadow becomes larger or remains the same, the character was read out in an incorrect direction. The character must then be read out again with an angle having an inverse operational sign, whereby a determination is again made to see whether the character shadow has become smaller. This procedure is continued until the smallest possible character shadow occurs. The bit pattern readout corresponding to the smallest character shadow is ultimately offered to the classifier for appropriate classification.

Figure 2:
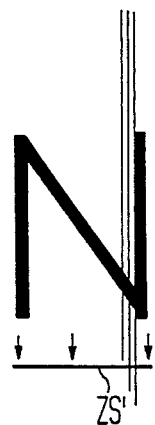
FIG. 2 illustrates the image pattern of the character of FIG. 1 read out at a slanting angle with a correspondingly shortened character shadow.

Symbolized by the scan line AL, FIG. 1 shows a readout of the image pattern matrix BM at a certain shear angle, which happens to be aligned with the direction of the slant. The result of this scanning event is shown in FIG. 2 and shows a perpendicularly residing character N whose character shadow ZS' is correspondingly shorter in comparison to FIG. 1. The character of FIG. 2 thus comprises the shortest possible character shadow.

In addition to editing of slanting individual characters, the method set forth above also serves for character separation when no white zone is recognized in the perpendicular projection of two neighboring characters, so that the character shadow, for example, reaches the width of two characters. In this case, too, the bit patterns of the individual characters are read out from the image signal memory at different angles up to a maximum of $\pm 45°$ until a white gap appears between two characters, assuming that these characters are not joined to one another. In this case, the character read out or scanned at the respective angle at which it can be separated from other characters is offered to the classifier. The characters read out or scanned at this separating angle also generally reside perpendicularly, i.e. with minimum shadow lengths, so that the classifier can also more easily recognize this character.

Given italic script, the slanted attitude of a plurality of characters is identified. Since this is a matter of machine script, the slanted attitude of the characters is the same in all characters. It therefore suffices to identify the optimum slanting character attitude for the first character which is scanned, the following characters then also being capable of being read out at this optimum slanted character attitude.

Figure 3:
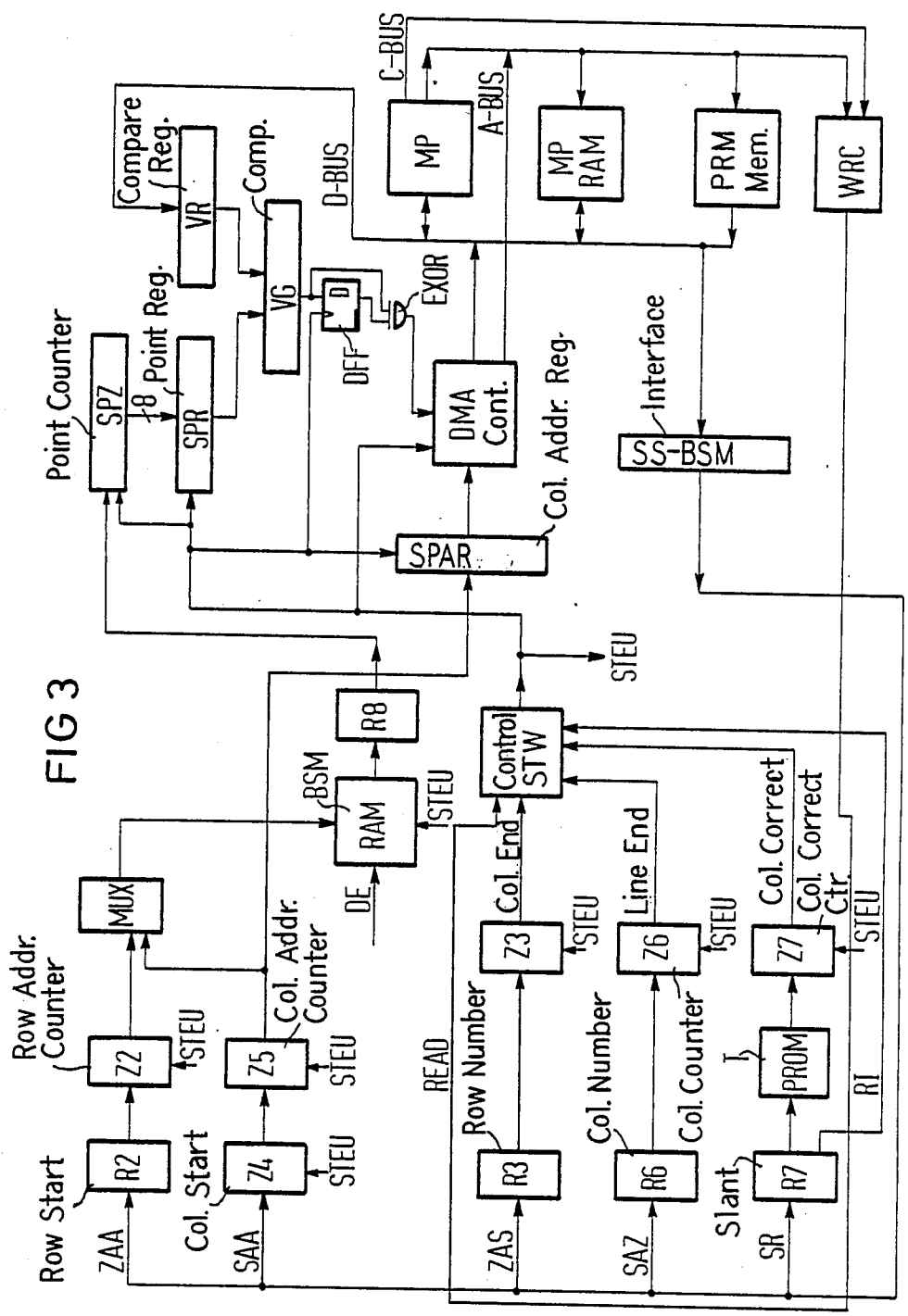
FIG. 3 is a functional block diagram of a circuit arrangement of the invention for editing slanting characters.

FIG. 3 shows the circuit arrangement provided for the implementation of the method of the invention. This circuit arrangement contains a control processor system composed of microprocessor MP, a main memory MP-RAM and a program memory PRM, to each of which a common data and address bus D-BUS, A-BUS is allocated. Further, a write-read instruction control WRC composed of a programmable read-only memory is provided, connected to the address bus A-BUS and to the control bus C-BUS of the control processor system. Via an image memory interface SS-BSM formed of BUS driver and transceiver, a plurality of input parameters are transmitted to the readout hardware of the image signal memory BSM containing the respectively current character in binary form (black point/white point pattern). This image signal memory BSM is composed of a plurality of RAM modules subdivided in rows and columns and comprising the data input DE. The memory is addressable in accord with the X/Y- coordinate system and is first read out column-by-column in a standard way. The character shadow of the originally imaged character projected onto the character base line is also formed on the basis of the readout information. A slanting readout at a first shear angle ensues next. The character field to be read out is thereby defined by the start address coordinates of the left-hand, upper corner point as well as by the row number per column and by the column number. The slant with indication of direction (positive or negative) indicates the suspected slant angle or the cursive attitude of the character. It is determined by a five bit combination (4 bits for the slant, 1 bit for the direction), so that a total of 16 different shear angles are accommodated. The input parameters needed for the readout event are stored in the following way:

row start address ZAA: in Register R2
column start address SAA: in Counter Z4
row number per column ZAS: in Register R3
column number SAZ: in Register R6
character slant SR (pos. neg): in Register R7

After a read instruction READ has been forwarded from the control processor to a control unit STW formed by a programmable read-out memory, the read-out event is initiated, whereby the following loading events are first executed controlled by the control signal STEU:

(a) Content of Register R2 into row address counter Z2

(b) Content of Counter Z4 into column address counter Z5

(c) Content of Register R3 into row counter Z3

(d) Content of Register R6 into column counter Z6

(e) Content from the memory PROM (divider T) under the address of the content (slant, 4 bits) of Register R7 into column correction counter Z7, as well as of the content RI (direction, positive/negative, 1 bit) from Register R7 into control unit STW.

The actual readout event begins after the loading of the input parameters. It ensues in order of the column direction. The column address from the column address counter Z5 and the row address from the row address counter Z2 are successively applied via the multiplexer MUX for every readout cycle. Every readout cycle makes a data bit available at the output of the register R8 following the image signal memory BSM, this data bit being accepted by the control processor. The counter Z2 is incremented and the counters Z3 and Z7 are decremented after every readout cycle.

A correction of the column address counter Z5 ensues after respectively T data bits, whereby the desired slanting readout is achieved. T is the parameter loaded in the column correction counter Z7 that indicates the angle of the respective shear angle at which the character should be read out. The correction of the column address counter Z5 is effected by the counter overflow ColCorrect via the control unit STW in that the column counter Z5 is incremented given positive slant and is decremented given negative slant. A trapezoid-like readout event thereby derives, as shown in FIG. 1 for negative slant with reference to the example of the scan line AL. At the end of the column, the counter overflow ColEnd of the row counter Z3 increments the column address in the counter Z4 and de-increments the column counter Z6. The column end is reached when the readout data bits per column correspond to the number of rows per column, i.e. correspond to the amount loaded in the row counter Z3.

Before a new trapezoid column is documented, the loading events (a), (b), (c) and (e) are repeated with the prescription that the column address counter Z5 is loaded with the new column address from the counter Z4. The end of the readout event for the defined character field is characterized by the counter overflow LineEnd of the column counter Z6.

The binarily coded character data are read out of the image signal memory BSM in column-by-column order and are conducted to the input of a black point counter SPZ that is counted up only given a black information. At column end, the counter reading of this black point counter SPZ is transferred into a following black point register SPR. At the same time, the column address is transferred from the column address counter Z5 of the image signal memory BSM into a column address register SPAR.

A comparison value offered by a microprocessor MP is written into a comparison register VR. The content of the black point register SPR is compared to the content of the comparison register VR in a comparator VG. Given a smaller value in the comparison register VR when compared to the black point register SPR, the value 1 is produced as for the output signal of the comparator VG; when, by contrast, the value in the comparison register VR is greater than or equal to (the value of the black point register SPR), then the value 0 is produced as for the output signal at the comparator VG. The output signal of the comparator VG is applied to a D-flip-flop DFF whose output is operated with the output signal of the comparator VG via an exclusive-OR circuit EXOR. When there is inequality between the output of the comparator VG and the output of the D-flip-flop DFF, the exclusive-OR circuit EXOR supplies the value 1 at the output to a following DMA control DMA. The column address of the image signal memory BSM offered in the column address register SPAR is thus only transmitted into the main memory MP-RAM of the microprocessor MP under the supervision of the DMA control when a modification of the signal appears at the comparator VG, i.e. when the value changes from 0 to 1 or from 1 to 0. The respective segment boundaries are thus transferred into the microprocessor MP which then undertakes the evaluation of the character shadow.

It will be apparent that various modifications and/or additions may be made in the apparatus of the invention without departing from the essential feature of novelty involved, which are intended to be defined and secured by the appended claims.

What is claimed is:

1. A method for editing slanting characters, particularly handwritten characters, whereby character representing signals produced by an opto-electric photodiode matrix are converted into binary signals and are stored in an image signal memory subdivided into columns and rows, including the steps of:

reading out the image signal memory, while addressing the same in the X/Y-coordinate system, in column-by-column order and forming a character shadow by projection of the successive columns respectively comprising black points onto the character base line;

conducting a second readout event with a direction of scan lying obliquely relative to the Y-axis, such that the column-by-column readout event beginning at a start address within every column effects a skip into the respectively neighboring column after a respectively prescribed number of rows;

comparing the second character shadow formed from the result of the second readout event to the first character shadow;

in the case of a comparatively larger second character shadow, conducting a third readout event with reversed slanting attitude of the scan family; and in the case of a comparatively smaller character shadow after the second or third readout event, conducting at least one further readout event from a larger scan angle until a larger character shadow or a character shadow that is at least of the same size is produced in comparison to the most recently identified character shadow; and selecting the readout result allocated to the respectively smallest character shadow for further evaluation of the character.

2. A circuit arrangement for the implementation of the method according to claim 1, comprising an image signal memory (BSM), means for connecting the address input of said image signal memory via a multiplexer (MUX) to, first, a row address counter (Z2) for the row start address and, second, to a column address counter (Z5) for the column address, a control unit (STW), a row counter (Z3), a column counter (Z6), a register (R7) for storing the direction of the slanting attitude, a column monitor counter (Z7), a write-read instruction control (WRC), and means for connecting inputs of said control unit to said counters, to said register, and to said instruction control, a black point counter (SPZ) that is connected to the output (R8) of said memory, a black point register (SPR) connected to said black point counter (SPZ), a comparator (VG) whose first input is connected to the output of the black point register (SPR) and whose second input is connected to the output of a comparison register (VR), a flip-flop (DFF) connected to the output of said comparator (VG) and controlled by the column end, means for connecting the output of said flip-flop with the output of the comparator (VG) via an exclusive-OR circuit (EXOR)

means for connecting the output of said exclusive-OR circuit to a direct memory access control (DMA) of a microcomputer system (MP, MP-RAM, PRM) that controls the image signal memory (BSM) and the control unit (STW).

* * * * *